United States Patent
Park

(10) Patent No.: US 10,865,722 B2
(45) Date of Patent: Dec. 15, 2020

(54) METHOD FOR EXTENDED DRIVING MODE OF HYBRID VEHICLE AND EXTENDED DRIVING MODE SYSTEM THEREOF

(71) Applicants: Hyundai Motor Company, Seoul (KR); Kia Motors Corporation, Seoul (KR)

(72) Inventor: Jae-Bum Park, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/373,515

(22) Filed: Apr. 2, 2019

(65) Prior Publication Data
US 2020/0049083 A1    Feb. 13, 2020

(30) Foreign Application Priority Data
Aug. 13, 2018    (KR) .................. 10-2018-0094349

(51) Int. Cl.
*F02D 7/00*     (2006.01)
*F02D 41/00*    (2006.01)
*B60W 10/04*    (2006.01)
*B60W 20/13*    (2016.01)

(52) U.S. Cl.
CPC ......... *F02D 41/0087* (2013.01); *B60W 10/04* (2013.01); *B60W 20/13* (2016.01); *F02D 2041/0012* (2013.01)

(58) Field of Classification Search
CPC ........ F02D 13/04; F02D 13/06; F02D 17/023; F02D 41/0087; F02D 41/123
USPC ................... 123/481, 482, 198 F; 701/101
See application file for complete search history.

(56) References Cited

U.S. PATENT DOCUMENTS

| | | | |
|---|---|---|---|
| 2002/0112903 A1* | 8/2002 | Wakashiro | B60K 6/543 180/65.26 |
| 2016/0009273 A1* | 1/2016 | Nagamine | B60W 10/107 180/65.25 |
| 2020/0122709 A1* | 4/2020 | Cunningham | F01N 13/107 |

FOREIGN PATENT DOCUMENTS

KR    10-2010-0063308 A    6/2010

* cited by examiner

*Primary Examiner* — John Kwon
(74) *Attorney, Agent, or Firm* — Morgan, Lewis & Bockius LLP

(57) ABSTRACT

A method for extended driving mode of a hybrid vehicle mounted with a cylinder of an engine deactivation (CDA) device may include controlling to switch cylinders of an engine into an idle state through a variable valve control mechanism in an engine stop mode.

15 Claims, 6 Drawing Sheets

METHOD FOR EXTENDED DRIVING MODE OF HYBRID VEHICLE AND EXTENDED DRIVING MODE SYSTEM THEREOF

CROSS-REFERENCE TO RELATED APPLICATION

The present application claims priority to Korean Patent Application No. 10-2018-0094349, filed on Aug. 13, 2018, the entire contents of which is incorporated herein for all purposes by this reference.

BACKGROUND OF THE INVENTION

Field of the Invention

The present invention relates to a hybrid vehicle, and particularly, to a method for an extended driving mode, which can improve vehicle fuel economy by extending a driving mode to a cylinder deactivation (CDA) mode of an extended driving mode system using a variable valve control mechanism.

Description of Related Art

In general, among hybrid vehicles, a mild hybrid electric vehicle may include an internal combustion engine (e.g., diesel engine or gasoline engine), a mild hybrid starter & generator system (MHSG), an engine clutch for connection/disconnection of an engine and a motor, and a transmission.

As basic driving modes, the mild hybrid electric vehicle implements an electric vehicle (EV) mode in which only a motor is used as a power source in the same manner as a typical hybrid vehicle, a hybrid electric vehicle (HEV) mode in which an engine and a motor are used as power sources, and a regenerative braking mode.

Furthermore, unlike an engine start of a typical hybrid vehicle, the mild hybrid electric vehicle performs an engine start through MHSG cranking since the MHSG system of the mild hybrid electric vehicle may include a hybrid starter & generator (HSG), a 48V battery, and a low voltage DC/DC converter (LDC).

However, the mild hybrid electric vehicle forms an engine monitoring state by direct connection to a motor and an engine through a P0 system in which a motor driving is performed through a belt or a P1 system in which the motor driving is performed through a flywheel, and thus engine friction occurs greatly as compared with the hybrid vehicle mounted with a separate motor.

As an example, in the mild hybrid electric vehicle, a low load operation (i.e., EV mode) and a vehicle speed reduction or engine overrun operation (e.g., regenerative braking mode in accordance with vehicle braking) causes the engine friction to occur greatly, and the occurrence of the engine friction deteriorates fuel economy.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for an extended driving mode of a hybrid vehicle and an extended driving mode system thereof, which can reduce engine friction due to an engine monitoring state in a CDA mode using a variable valve control mechanism, and, achieve direct fuel economy improvement through the reduction of the engine friction by extending an EV mode of low load driving and a regenerative braking mode of a vehicle speed reduction and engine overrun driving to the CDA mode.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a method for an extended driving mode of a hybrid vehicle may include performing cylinder deactivation (CDA) mode control to switch cylinders of an engine into deactivation or an idle state through a variable valve control mechanism when an engine stop mode or an engine non-operation driving mode, in which an engine power is not required, is recognized by a controller.

In an exemplary embodiment of the present invention, the hybrid vehicle may include a mild hybrid electric vehicle, and the variable valve control mechanism is a cylinder of an engine deactivation (CDA) device.

In an exemplary embodiment of the present invention, the performing of the CDA mode control may include dividing the engine stop mode or the engine non-operation driving mode into an electric vehicle (EV) mode in which a motor is used as a power source and a regenerative braking mode in which power generation is performed by the motor; performing CDA mode switching in association with the variable valve control mechanism; and performing CDA mode application to switch the cylinders into deactivation or the idle mode.

As an exemplary embodiment of the CDA mode control, the EV mode is applied prior to the regenerative braking mode applied when the engine does not consume a fuel. The performing of the CDA mode switching is divided into performing low-load CDA mode switching for generating a positive (+) torque of the motor through the EV mode; and performing regenerative braking CDA mode switching for generating a negative (−) torque of the motor through the regenerative braking mode. The performing of the CDA mode application supplies a hydraulic fluid for an operation of the variable valve control mechanism.

In an exemplary embodiment of the present invention, when the engine stop mode or the engine non-operation driving mode is not recognized, a CDA non-operation control to drive the engine is switched to be performed without operating the variable valve control mechanism.

In accordance with various exemplary embodiments of the present invention, an extended driving mode system of a hybrid vehicle may include a controller configured to perform cylinder deactivation (CDA) mode control to switch cylinders of an engine into deactivation or an idle state through a variable valve control mechanism when an engine stop mode or an engine non-operation driving mode, in which an engine power is not required, is recognized, and to perform CDA non-operation control not to operate the variable valve control mechanism when the engine stop mode or the engine non-operation driving mode is not recognized.

In an exemplary embodiment of the present invention, the variable valve control mechanism is a cylinder of an engine deactivation (CDA) deactivation (CDA) device disposed for each of the cylinders of the engine to be operated by a hydraulic fluid.

In an exemplary embodiment of the present invention, the engine may include a P0 system connected to a motor through a belt or a P1 system connected to the motor through a flywheel.

In an exemplary embodiment of the present invention, the hybrid vehicle may include a mild hybrid electric vehicle.

The method for the extended driving mode of the hybrid vehicle performed by the extended driving mode system according to an exemplary embodiment of the present invention implements the following operations and effects.

First, the driving mode of the hybrid vehicle is extended to the CDA mode using the variable valve control mechanism in addition to the EV/HEV/regenerative braking modes. Second, in the CDA mode, the engine friction due to the engine monitoring state is reduced in the system in which the motor driving is performed through the belt or the flywheel. Third, in the CDA mode in association with the EV mode, the engine friction is minimized in the engine non-operation state during the low-load driving to improve fuel economy. Fourth, through minimization of the engine friction during the vehicle speed reduction and the engine overrun driving in the CDA mode in association with the regenerative braking mode, the regenerative braking amount is increased, and the fuel economy is improved. Fifth, high engine friction, engine efficiency deterioration, and fuel economy deterioration due to low efficient engine drivepoint driving that appears to be in the mild hybrid electric vehicle to which the P0 system and the P1 system are applied may be improved in all. Sixth, through applicability to the hybrid vehicle, great performance improvement may be obtained in the mild hybrid electric vehicle.

It is to be understood that both the foregoing general description and the following detailed description of the present invention are exemplary and explanatory and are intended to provide further explanation of the disclosure as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
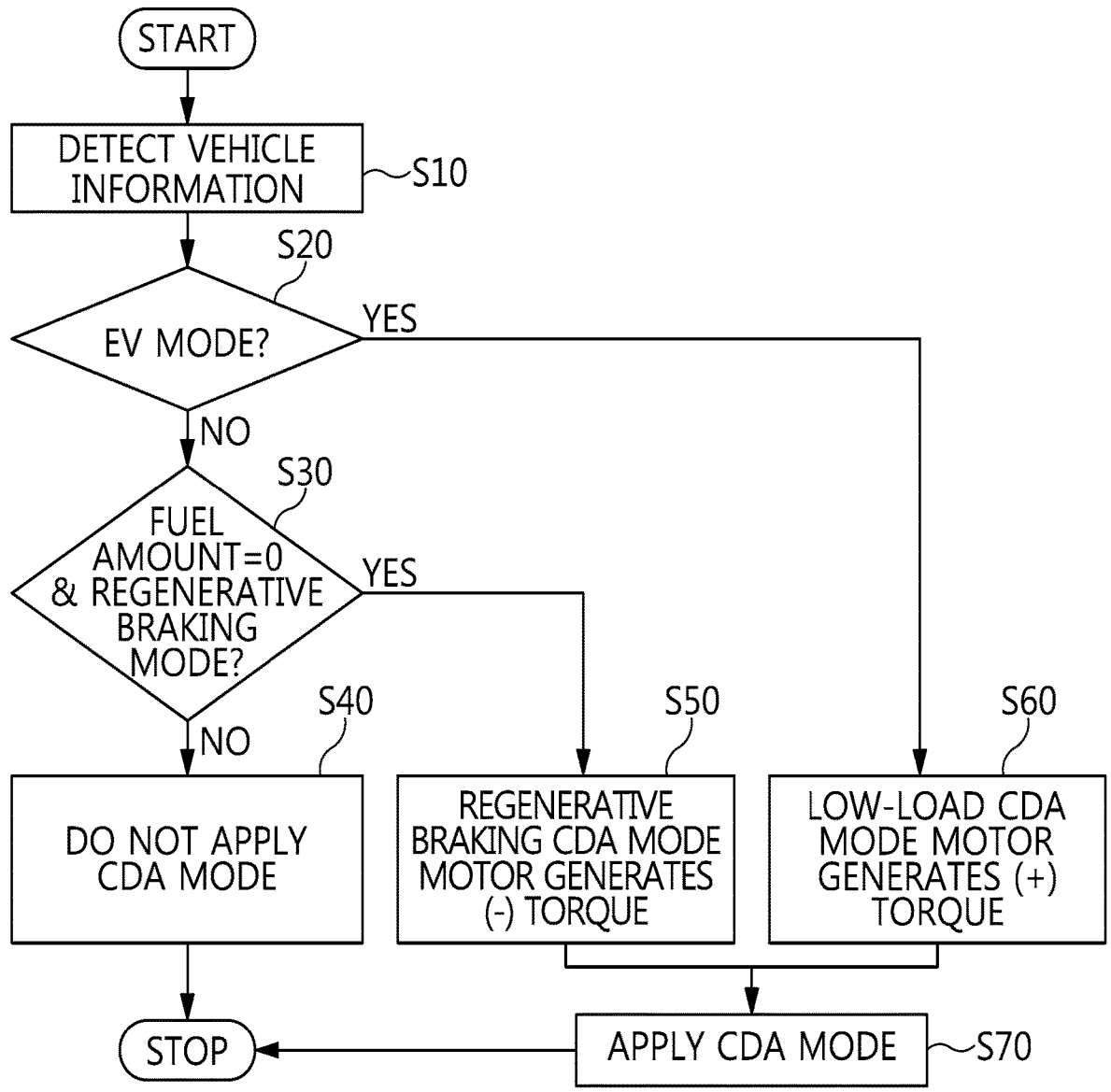
FIG. 1 is a flowchart of a method for an extended driving mode of a hybrid vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described in detail with reference to the accompanying drawings. However, since such an exemplary embodiment of the present invention is exemplary and may be implemented in various different types by those of ordinary skill in the art to which the present invention pertains, the present invention is not limited to the exemplary embodiment described hereinafter.

Referring to FIG. 1, in a method for an extended driving mode of a hybrid vehicle, when an EV mode or a regenerative braking mode is recognized from vehicle information as a driving mode (S10), the driving mode is switched to a CDA mode control (i.e., CDA mode application control) (S20 to S60) for performing engine cylinder control through a variable valve control mechanism, whereas when a driving mode excluding the EV and regenerative braking modes is recognized, the driving mode is switched to a CDA non-operation control (i.e., CDA mode non-application control) (S20 to S30, and S70) in which the engine cylinder control through the variable valve control mechanism is not performed. The CDA mode control (S10 to S60) can effectively overcome the engine friction during a Hybrid Starter Generator (HSG) operation which is performed in a low-load operation section with low engine efficiency by applying the cylinder of an engine deactivation (CDA) to the whole cylinders of the engine as the variable valve control mechanism.

Accordingly, the method for the extended driving mode of the hybrid vehicle is suitable for the hybrid vehicle, and, it is suitable for the mild hybrid electric vehicle provided with the P0 system (it drives a motor through a belt) and the P1 system (it drives a motor through a flywheel) in which the motor is directly connected to the engine.

Figure 2:
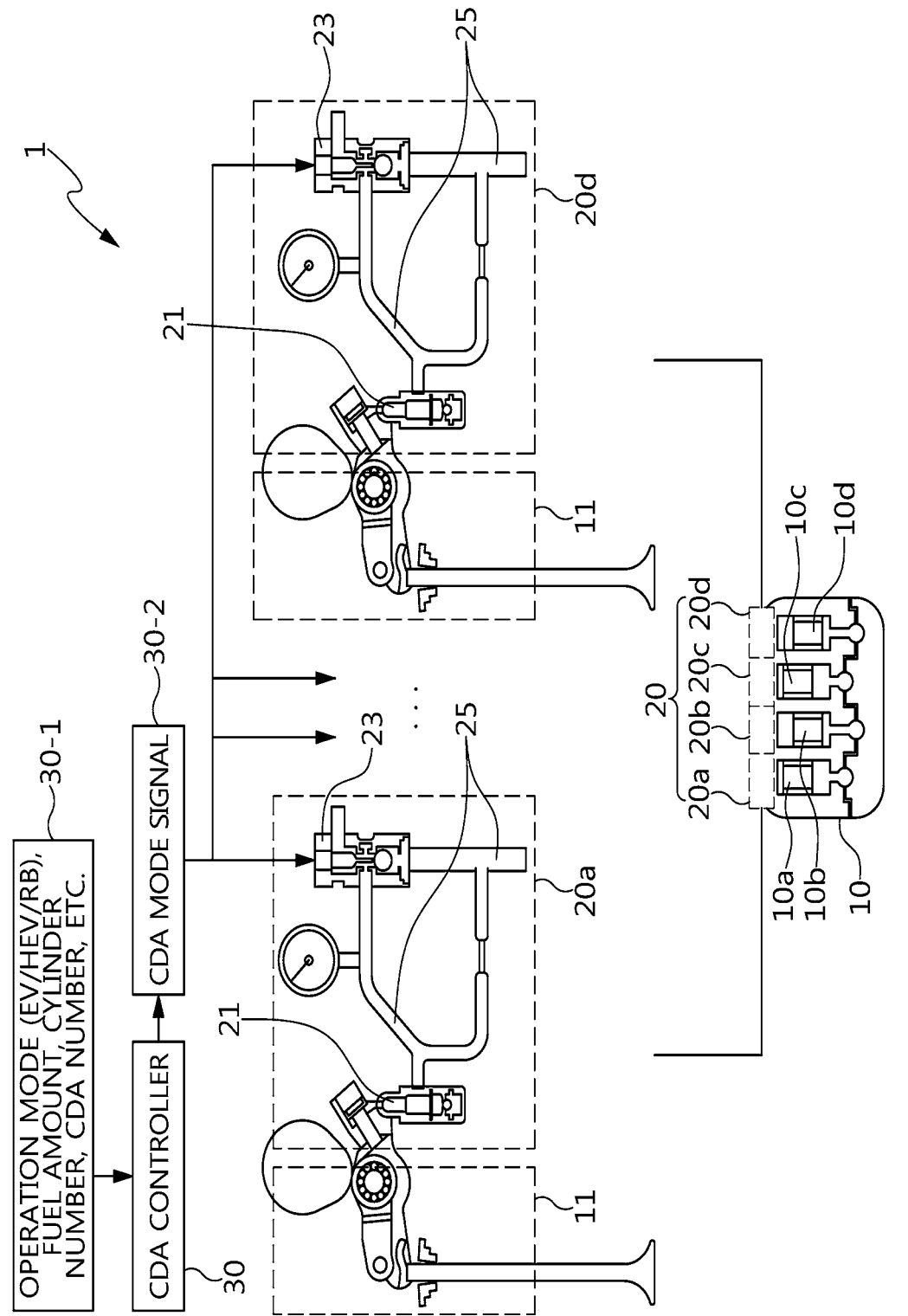
FIG. 2 is a diagram illustrating an example in which an extended driving mode system according to an exemplary embodiment of the present invention is implemented using a cylinder of an engine deactivation (CDA) mechanism among variable valve control mechanisms.

As such, referring to FIG. 2, an extended driving mode system 1 includes an engine 10, a variable valve control mechanism 20 associated with a valve system 11, and a controller associated with the variable valve control mechanism 20.

As an example, the engine 10 has combustion chambers corresponding to first to fourth cylinders 10a, 10b, 10c, and 10d. The valve system 11 has intake/exhaust valves associated with the first to fourth cylinders 10a, 10b, 10c, and 10d, respectively, and is associated with a camshaft.

As an example, the variable valve control mechanism 20 includes first to fourth variable valve control mechanisms 20a, 20b, 20c, and 20d controlling the first to fourth cylinders 10a, 10b, 10c, and 10d through the valve system 11, and each of the first to fourth variable valve control mechanisms 20a, 20b, 20c, and 20d includes a cylinder of an engine deactivation (CDA) device 21, an oil control valve 23, and a hydraulic line 25. The CDA 21 is provided with a latching pin which is latched (i.e., is turned on) or unlatched (i.e., is turned off) by a hydraulic action. The oil control valve 23 controls hydraulic fluid supply to the CDA device 21. The hydraulic line 25 sends hydraulic fluid from the oil control valve 23 to the CDA device 21 during latching of the CDA device 21, and draws the hydraulic fluid from the CDA device 21 to the oil control valve 23 during unlatching of the CDA device 21.

As an example, the controller 30 is provided with data input unit 30-1 and a mode signal output unit 30-2 for on/off control of the oil control valve 23 to operate the CDA device 21. The data input unit 30-1 detects vehicle information in accordance with an operation of the engine 10 and transfers the vehicle information to the controller 30, and the vehicle information includes an operation mode which is classified into EV/HEV/regenerative braking/CDA modes, a fuel amount, a cylinder number, and a CDA number. The mode signal output unit 30-2 transfers an output signal of the controller 30 to the oil control valve 23.

Hereinafter, the method for the extended driving mode of the hybrid vehicle of FIG. 1 will be described in detail with reference to FIGS. 2 to 5. In the instant case, the control subject is the controller 30, and the control target is the oil control valves 23 of the first to fourth variable valve control mechanisms 20a, 20b, 20c, and 20d.

The controller 30 detects a vehicle driving condition through the vehicle information detection of S10. Referring to FIG. 2, the controller 30 receives an operation mode which is classified into EV/HEV/regenerative braking modes, a fuel amount, a cylinder number, and a CDA number, which are transferred from the data input unit 30-1.

As such, the controller 30 performs CDA mode control (S10 to S60) including EV mode determination (S20), low-load CDA mode switching (S30), regenerative braking mode determination (S40), regenerative braking CDA mode switching (S50), and CDA mode application (S60). In the instant case, the EV mode (S20) and the regenerative braking mode (S40) are defined as an engine stop mode or an engine non-operation driving mode.

As an example, the EV mode determination (S20) determines the EV mode from the operation mode among the transferred vehicle information. In a case of the EV mode as the result of the determination, the low-load CDA mode switching (S30) is performed. Since the low-load CDA mode switching (S30) operates a motor configured for vehicle driving, the motor generates a positive (+) torque.

Accordingly, the CDA mode application (S60) performs an EV mode operation in a CDA operation state with respect to the whole cylinders of the engine through the low-load CDA mode, and thus fuel economy is improved through a CDA engine friction reduction effect.

As an example, the regenerative braking mode determination (S40) determines the regenerative braking mode in which fuel is not consumed from the operation mode among the transferred vehicle information. In a case of the regenerative braking mode as the result of the determination, the regenerative braking CDA mode switching (S50) is performed. Since the regenerative braking CDA mode switching (S50) reversely operates the motor through the vehicle braking, the motor generates a negative (−) torque.

Accordingly, the CDA mode application (S60) performs a regenerative braking mode operation in the CDA operation state with respect to the whole cylinders of the engine through the regenerative braking CDA mode, and thus fuel economy is improved through a regenerative energy increase effect together with the CDA engine friction reduction effect.

Figure 3:
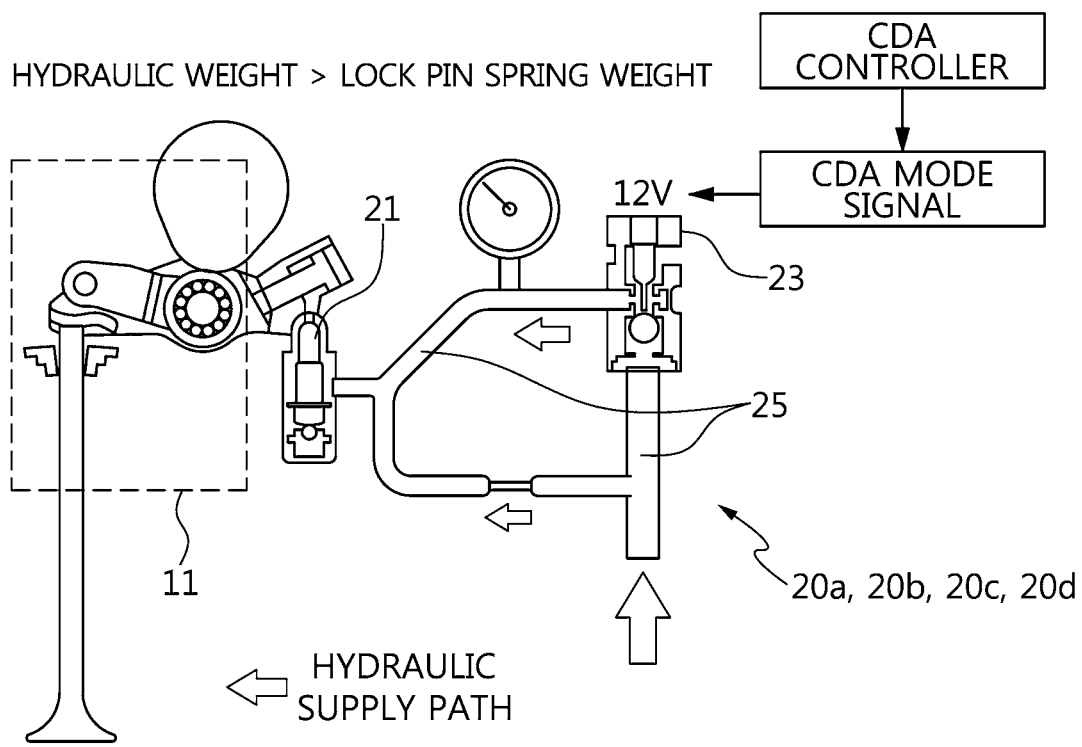
FIG. 3 is a diagram illustrating an operation state of an extended driving mode system in a state where a cylinder deactivation (CDA) mode is applied according to an exemplary embodiment of the present invention.

Referring to FIG. 3, it is exemplified that the first to fourth variable valve control mechanisms 20a, 20b, 20c, and 20d operate in the first to fourth cylinders 10a, 10b, 10c, and 10d, respectively, in the low-load CDA mode or the regenerative braking CDA mode. In the instant case, although the output of the controller 30 can control only parts of the first to fourth cylinders 10a, 10b, 10c, and 10d to be in an idle state by operating only parts of the first to fourth variable valve control mechanisms 20a, 20b, 20c, and 20d, it is assumed that the whole cylinders are controlled.

The mode signal output unit 30-2 of the controller 30 turns on the oil control valve 23 by applying an output signal (e.g., 12V power) corresponding to the low-load CDA mode or the regenerative braking CDA mode thereto, and the oil control valve 23 changes its internal flow path to a supply flow path to send hydraulic fluid supplied from external to the CDA device 21 through the hydraulic line 25. In the instant case, the CDA device 21 operates the valve system 11 by overcoming a lock pin weight of a latching pin through a hydraulic weight and being switched from unlatching to latching, and thus the valve system 11 maintains the engine 10 in an idle state. As a result, the engine 10 can reduce an influence that the valve system 11 exerts on the first to fourth cylinders 10a, 10b, 10c, and 10d.

Figure 4:
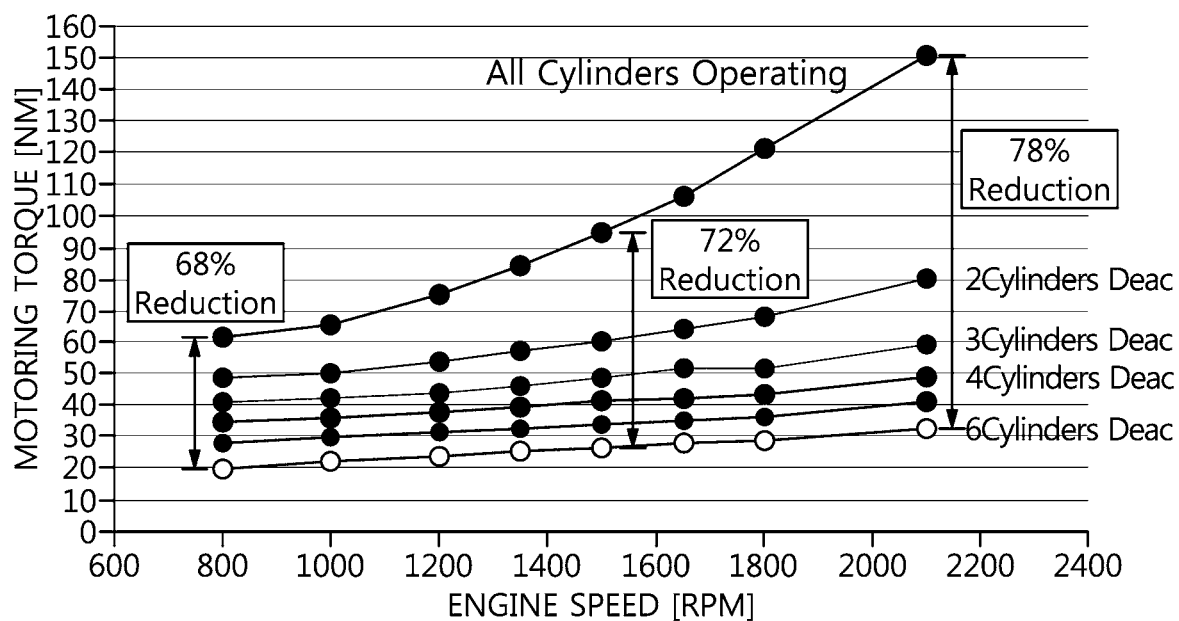
FIG. 4 is a diagram explaining engine friction reduction during a cylinder deactivation (CDA) mode according to an exemplary embodiment of the present invention.

Referring to FIG. 4, an influence that the operation of the CDA device 21 exerts on each cylinder of a 6-cylinder engine is exemplified. As illustrated, it has been proved through experimental data that the engine friction is greatly reduced to reach about 68 to 78% as the number of cylinders in which the CDA device 21 operates is increased from 2 to 4 and 6 as compared with 6 cylinders in which the CDA device 21 does not operate.

Referring again to FIG. 1, the controller 30 performs the CDA non-operation control (S20 to S30, and S70) including the EV mode determination (S20), the low-load CDA mode switching (S30), and the CDA mode non-application (S70).

As an example, the EV mode determination (S20) determines that the operation mode is not the EV mode (e.g., HEV) among the transferred vehicle information. The regenerative braking mode determination (S40) determines that the operation mode is not the regenerative braking mode (e.g., HEV) in which fuel is not consumed among the transferred vehicle information. If the operation mode is not the EV mode or the regenerative braking mode as the result of the determination, the CDA mode non-application (S70) is performed, and in the CDA mode non-application (S70), the engine is driven.

Figure 5:
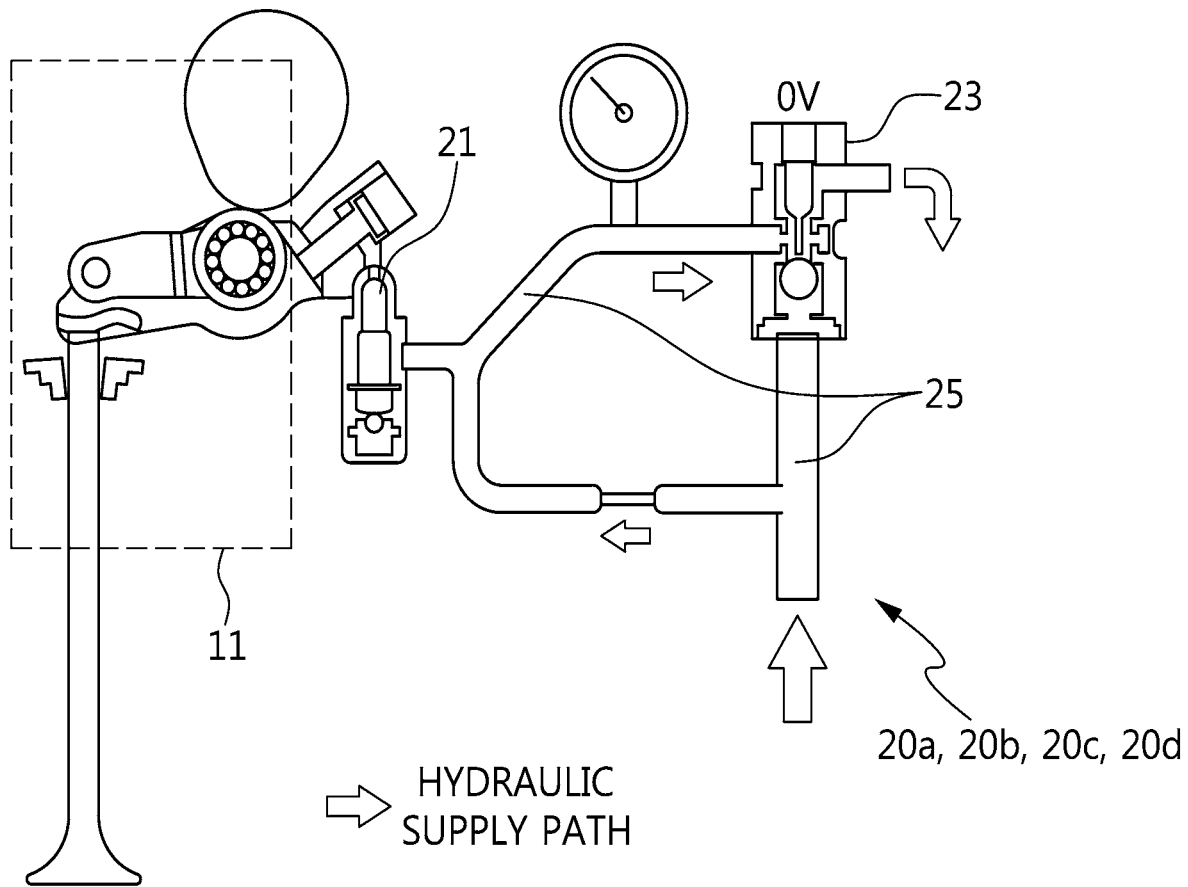
FIG. 5 is a diagram illustrating an operation state of an extended driving mode system in a state where a cylinder deactivation (CDA) mode is not applied according to an exemplary embodiment of the present invention.

Referring to FIG. 5, it is exemplified that the first to fourth variable valve control mechanisms 20a, 20b, 20c, and 20d do not operate in the first to fourth cylinders 10a, 10b, 10c, and 10d, respectively, in the CDA mode non-application.

The mode signal output unit 30-2 of the controller 30 turns off the oil control valve 23 by not applying its output signal (e.g., 12V power), and through this, the oil control valve 23 changes its internal flow path to a discharge flow path. In the instant case, the hydraulic line 25 discharges hydraulic fluid of the device 21 to outside through the oil control valve 23 in a state where the hydraulic fluid supply from the outside thereof is blocked. As a result, the CDA device 21 receives the lock pin weight of the latching pin due to release of the hydraulic weight, and is switched from latching to unlatching to operate the valve system 11. The operation of the valve system 11 maintains the engine 10 in a driven state.

Figure 6:
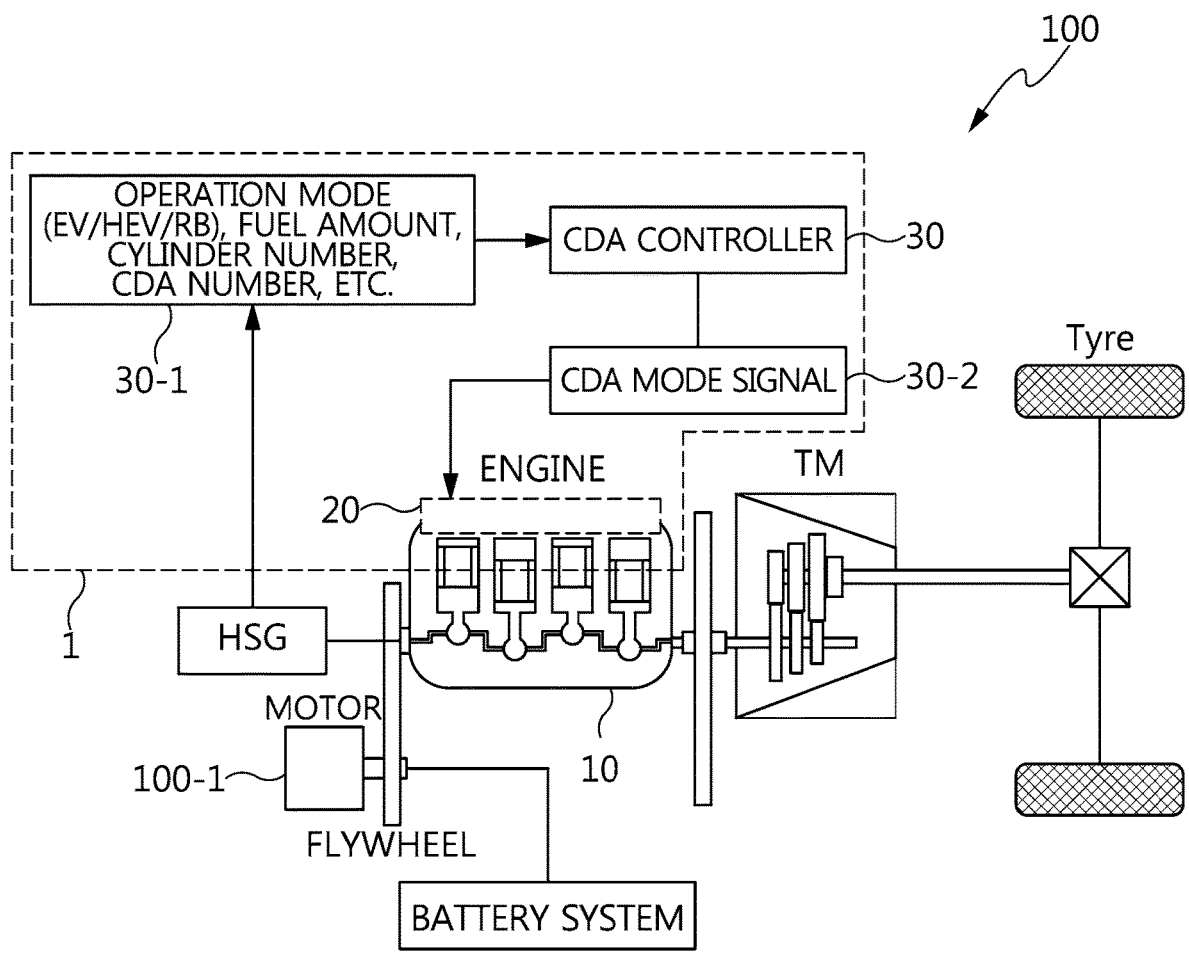
FIG. 6 is a diagram illustrating an example in which an extended driving mode system is applied to a mild hybrid electric vehicle to which a P0 system which is a belt motor driving system is applied according to an exemplary embodiment of the present invention.
Figure 7:
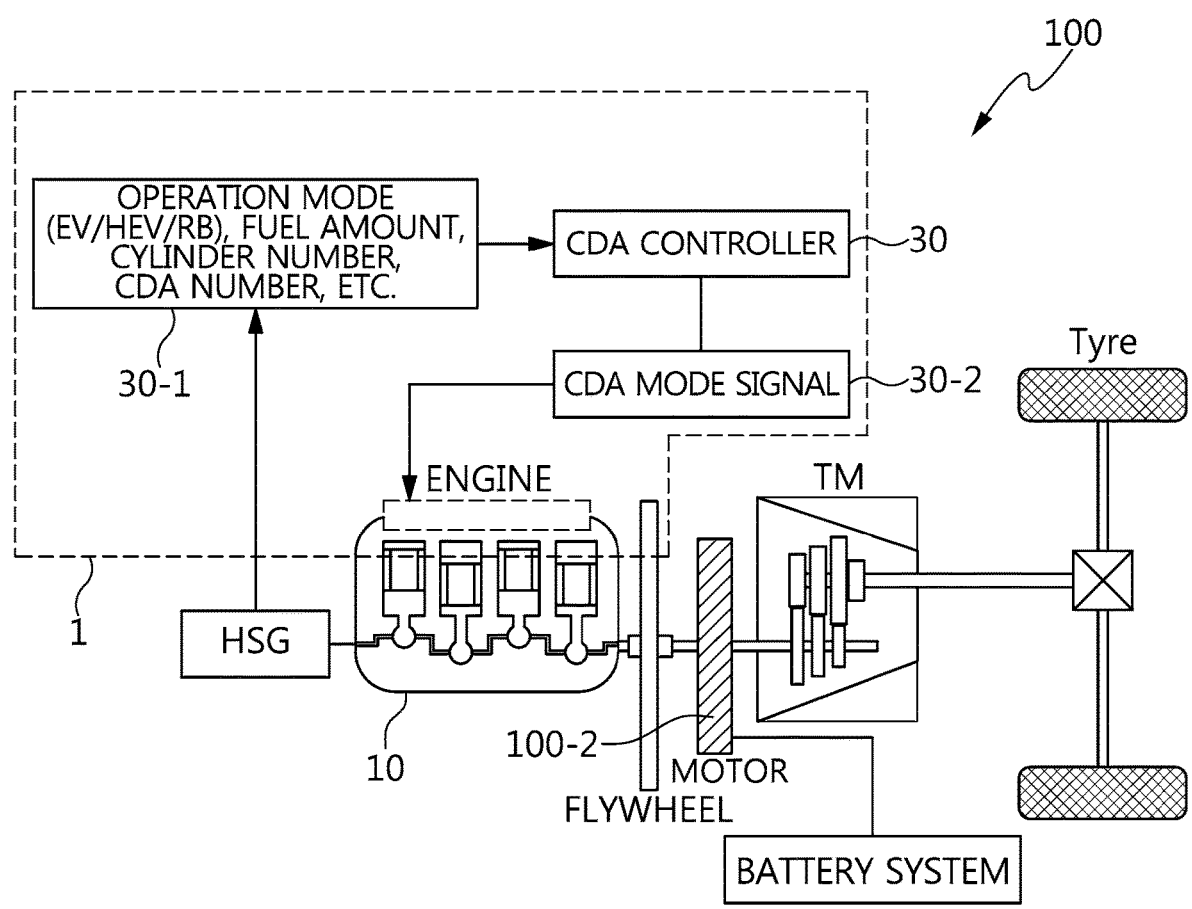
FIG. 7 is a diagram illustrating an example in which an extended driving mode system is applied to a mild hybrid electric vehicle to which a P1 system which is a flywheel motor driving system is applied according to an exemplary embodiment of the present invention.

On the other hand, FIG. 6 and FIG. 7 illustrate examples of a mild hybrid electric vehicle 100.

The mild hybrid electric vehicle 100 of FIG. 6 includes an extended driving mode system 1, an engine 10 connected to a transmission via a flywheel in an opposite direction of an HSG, and a P0 system 100-1. In contrast, the mild hybrid electric vehicle 100 of FIG. 7 includes an extended driving mode system 1, an engine 10 connected to a transmission via a flywheel in an opposite direction of an HSG, and a P1 system 100-2.

As an example, the P0 system 100-1 is provided with a motor which is driven by a belt connected to the engine 10, and includes a battery system for the motor. The P1 system 100-2 is provided with a motor which is driven by a flywheel connected to the engine 10, and includes a battery system for the motor.

As an example, the extended driving mode system 1 includes a variable valve control mechanism 20 having first to fourth variable valve control mechanisms 20a, 20b, 20c, and 20d that match first to fourth cylinders 10a, 10b, 10c, and 10d of the engine 10, and a controller 30 having a data input unit 30-1 and a mode signal output unit 30-2. Accordingly, the extended driving mode system 1 is equal to the extended driving mode system 1 of FIG. 2.

Accordingly, although the mild hybrid electric vehicle 100 is provided with a P0 system 100-1 or a P1 system 100-2, engine friction reduction and fuel economy improvement may be achieved during engine monitoring in the EV mode and the regenerative braking mode through the CDA mode control (S20 to S60) of FIG. 1 implemented by the extended driving mode system 1 which is a common constituent element. In particular, in experiments of the mild hybrid electric vehicle 100 having the P0 system 100-1 and the mild hybrid electric vehicle 100 having the P1 system 100-2, it has been proved that the monitoring friction torque is reduced by about 80% and the fuel economy improvement rate is improved by about 7.5% through the CDA operation during the engine overrun (or regenerative braking mode) and EV.

As described above, according to the method for the extended driving mode performed by the extended driving mode system of the hybrid vehicle according to various aspects of the present invention, the exemplary embodiment of the present invention, the CDA mode control to switch the cycles of the engine 10 to the idle state is performed through the variable valve control mechanism 20 when the engine stop mode or the engine non-operation driving mode in which the power of the engine 10 is not required by the controller 30 is recognized, whereas the CDA non-operation control not to operate the variable valve control mechanism 20 is performed when the engine stop mode or the engine non-operation driving mode is not recognized, resulting in that the engine friction reduction through the extended CDA mode brings direct fuel economy improvement.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for extended driving mode of a hybrid vehicle mounted with a cylinder of an engine deactivation (CDA) device, including:
    controlling to perform an idle state switching of cylinders of an engine,
    wherein the controlling to perform the ideal state switching of the cylinders is implemented by a CDA mode control through a controller; and
    wherein the CDA mode control when the engine of the hybrid vehicle is stopped includes:
        selecting, by the controller, an electric vehicle (EV) mode in which a motor is used as a power source and a regenerative braking mode in which power generation is performed by the motor;
        performing, by the controller, CDA mode switching in association with a variable valve control mechanism;
        performing, by the controller, CDA mode application for switching the cylinders of the engine into an idle mode, and
        switching, by the controller, a CDA non-operation control not to operate the variable valve control mechanism when the electric vehicle (EV) mode or the regenerative braking mode are not selected.

2. The method of claim 1, wherein the variable valve control mechanism is the cylinder of the engine deactivation (CDA) device.

3. The method of claim 1, wherein the EV mode is applied prior to the regenerative braking mode.

4. The method of claim 3, wherein the regenerative braking mode is applied when the engine does not consume a fuel.

5. The method of claim 1, wherein the CDA mode switching includes a low-load CDA mode switching by the EV mode and a regenerative braking CDA mode switching by the regenerative braking mode.

6. The method of claim 5, wherein the low-load CDA mode switching generates a positive (+) torque for the motor.

7. The method of claim 5, wherein the regenerative braking CDA mode switching generates a negative (−) torque for the motor.

8. The method of claim 1, wherein the CDA mode application supplies a hydraulic fluid for an operation of the variable valve control mechanism.

9. The method of claim 1, wherein the CDA non-operation control is configured to drive the engine.

10. An extended driving mode system of a hybrid vehicle, the extended driving mode system comprising:
a controller configured to perform cylinder deactivation (CDA) mode control to switch cylinders of an engine into deactivation through a variable valve control mechanism when an engine stop mode in which an engine power is not required is recognized, and to perform CDA non-operation control not to operate the variable valve control mechanism when the engine is stopped.

11. The extended driving mode system of claim 10, wherein the variable valve control mechanism is a cylinder of an engine deactivation (CDA) device.

12. The extended driving mode system of claim 11, wherein the CDA device is mounted for each of the cylinders of the engine.

13. The extended driving mode system of claim 11, wherein the CDA device is operated by hydraulic fluid.

14. The extended driving mode system of claim 10, wherein the engine includes a P0 system connected to a motor through a belt.

15. The extended driving mode system of claim 10, wherein the engine includes a P1 system connected to a motor through a flywheel.

* * * * *